US012615554B2

(12) United States Patent
Majjiga

(10) Patent No.: US 12,615,554 B2
(45) Date of Patent: Apr. 28, 2026

(54) SYSTEM AND METHOD FOR NETWORK SLICE DEPLOYMENT

(71) Applicant: VERIZON PATENT AND LICENSING INC., Basking Ridge, NJ (US)

(72) Inventor: Deepak Majjiga, Irving, TX (US)

(73) Assignee: Verizon tent and Licensing Inc., Basking Ridge, NJ (US)

( * ) Notice: Subject to any disclaimer, the term of this patent is extended or adjusted under 35 U.S.C. 154(b) by 329 days.

(21) Appl. No.: 18/338,512

(22) Filed: Jun. 21, 2023

(65) Prior Publication Data

US 2024/0430753 A1 Dec. 26, 2024

(51) Int. Cl.
*G06F 15/173* (2006.01)
*H04L 41/5019* (2022.01)
*H04W 28/24* (2009.01)

(52) U.S. Cl.
CPC ......... *H04W 28/24* (2013.01); *H04L 41/5019* (2013.01)

(58) Field of Classification Search
CPC . H04W 28/24; H04L 41/5019; H04L 41/5009
See application file for complete search history.

(56) References Cited

U.S. PATENT DOCUMENTS

| | | | | |
|---|---|---|---|---|
| 11,310,733 B1 * | 4/2022 | Gupta | ............... | H04W 28/0268 |
| 2022/0053476 A1 * | 2/2022 | Aksu | ................ | H04W 28/0215 |
| 2022/0377650 A1 * | 11/2022 | Kotaru | ................. | H04W 24/10 |
| 2023/0254223 A1 * | 8/2023 | Boulos | ................ | H04W 28/06 |
| | | | | 370/328 |
| 2023/0319645 A1 * | 10/2023 | Gautam | ................ | H04W 28/24 |
| | | | | 370/329 |

* cited by examiner

*Primary Examiner* — Duyen M Doan

(57) ABSTRACT

Disclosed are systems and methods for a network slice profile generation and deployment within 5G network infrastructures and operating environments. The disclosed systems and methods can provide mechanisms for automatically generating slice profiles based on device experience modes, which can be utilized to generate service assurance profiles that adhere/maintain service level agreements. The disclosed systems and methods can automate the generation of a fully deployable network slice profile, which enables functionality for the scaling of network slices per operational environment of such devices (e.g., modifying existing slices and/or selecting new slices). Moreover, the translation of the slice profile to service assurance profiles can provide network stability, which can improve operator reputation in maintaining service level agreements.

20 Claims, 8 Drawing Sheets

300

302 — Identify an application executing on a UE, inclusive of application information and operational values 304 — Retrieve historical KPI data for the application 306 — Analyze data related to the application and historical KPI data 308 — Determine KPI values for the application 310 — Generate a slice profile 312 — Generate a slice SLA based on the slice profile and the determined KPI values 314 — Receive information related to consent of the generated SLA 316 — Based on the consent, generate a slice assurance profile from the generated SLA 318 — Deploy the slice profile in line with the slice assurance profile of the application runtime environment

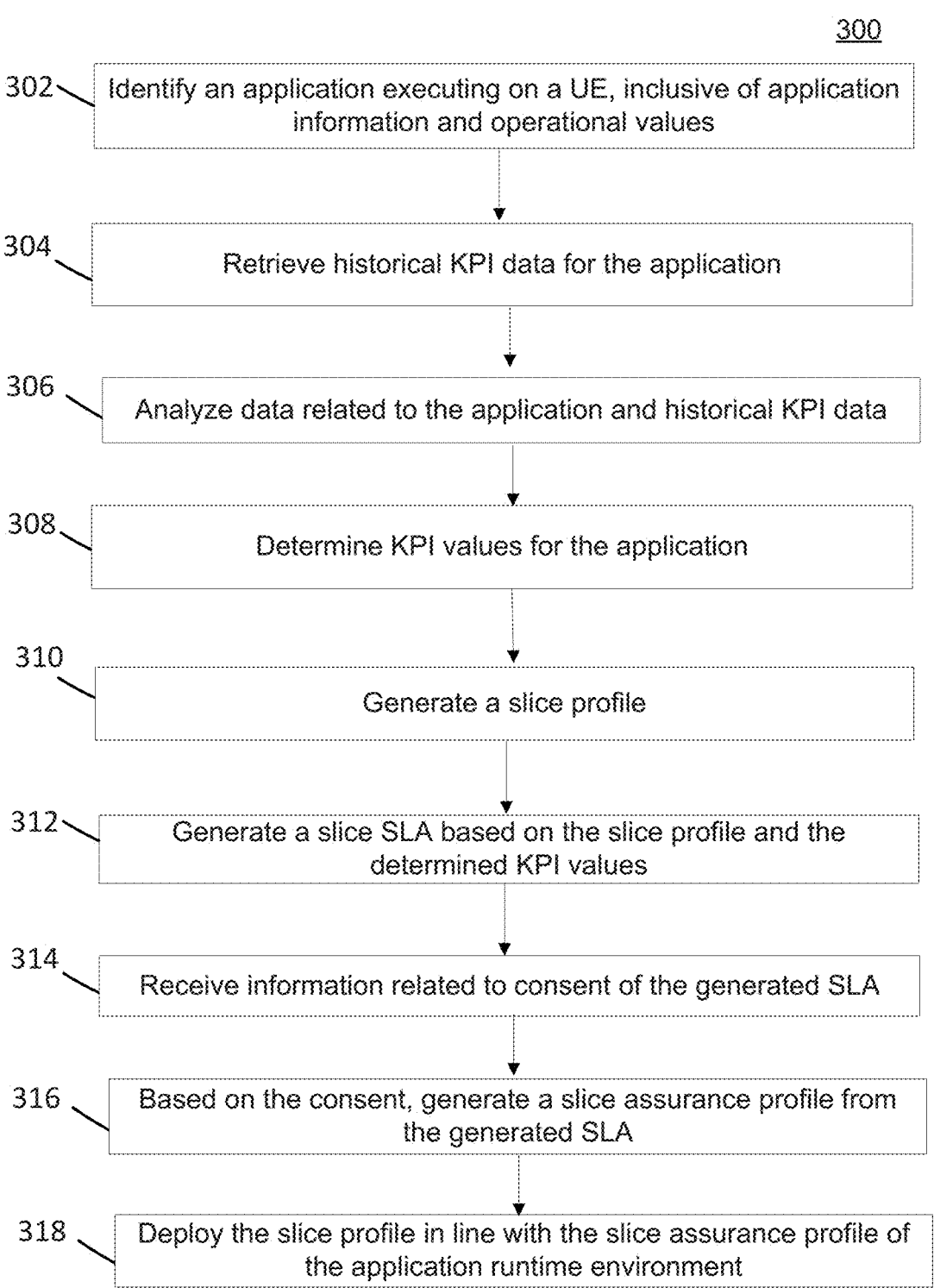

300

302 — Identify an application executing on a UE, inclusive of application information and operational values 304 — Retrieve historical KPI data for the application 306 — Analyze data related to the application and historical KPI data 308 — Determine KPI values for the application 310 — Generate a slice profile 312 — Generate a slice SLA based on the slice profile and the determined KPI values 314 — Receive information related to consent of the generated SLA 316 — Based on the consent, generate a slice assurance profile from the generated SLA 318 — Deploy the slice profile in line with the slice assurance profile of the application runtime environment

Figure 4B:
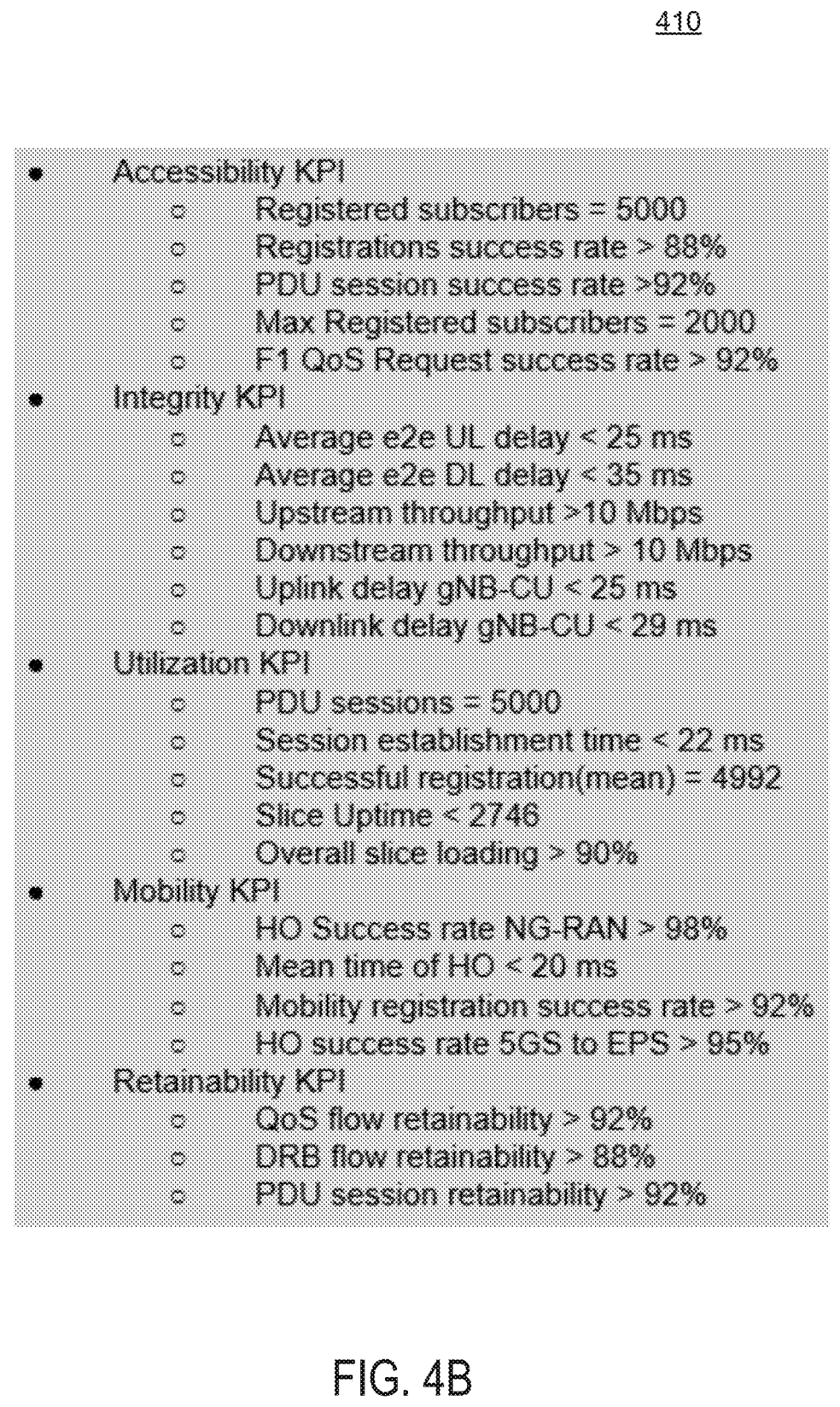

- Accessibility KPI
  - Registered subscribers = 5000
  - Registrations success rate > 88%
  - PDU session success rate >92%
  - Max Registered subscribers = 2000
  - F1 QoS Request success rate > 92%
- Integrity KPI
  - Average e2e UL delay < 25 ms
  - Average e2e DL delay < 35 ms
  - Upstream throughput >10 Mbps
  - Downstream throughput > 10 Mbps
  - Uplink delay gNB-CU < 25 ms
  - Downlink delay gNB-CU < 29 ms
- Utilization KPI
  - PDU sessions = 5000
  - Session establishment time < 22 ms
  - Successful registration(mean) = 4992
  - Slice Uptime < 2746
  - Overall slice loading > 90%
- Mobility KPI
  - HO Success rate NG-RAN > 98%
  - Mean time of HO < 20 ms
  - Mobility registration success rate > 92%
  - HO success rate 5GS to EPS > 95%
- Retainability KPI
  - QoS flow retainability > 92%
  - DRB flow retainability > 88%
  - PDU session retainability > 92%

```
{
        App : Video streaming in VR,
        Packet_drop_rate <  2%,
        Downlink_Bandwidth < 50Mbps,
        Uplink_bandwidth < 50Mbps,
        Latency < 30ms,
        Jitter < 30ms,
        Security = High,
}
```

422 —

```
{

App : Single player game 1,
        Packet_drop_rate <  5%,
        Downlink_Bandwidth < 100Mbps,
        Uplink_bandwidth < 100Mbps,
        Latency < 50ms,
        Jitter < 30ms,
        Security = High,
}
```

424 —

```
{

App : Multiplayer game with HW,
        Packet_drop_rate <  1%,
        Downlink_Bandwidth < 10Mbps,
        Uplink_bandwidth < 10Mbps,
        Latency < 10ms,
        Jitter < 10ms,
        Security = High,
}
```

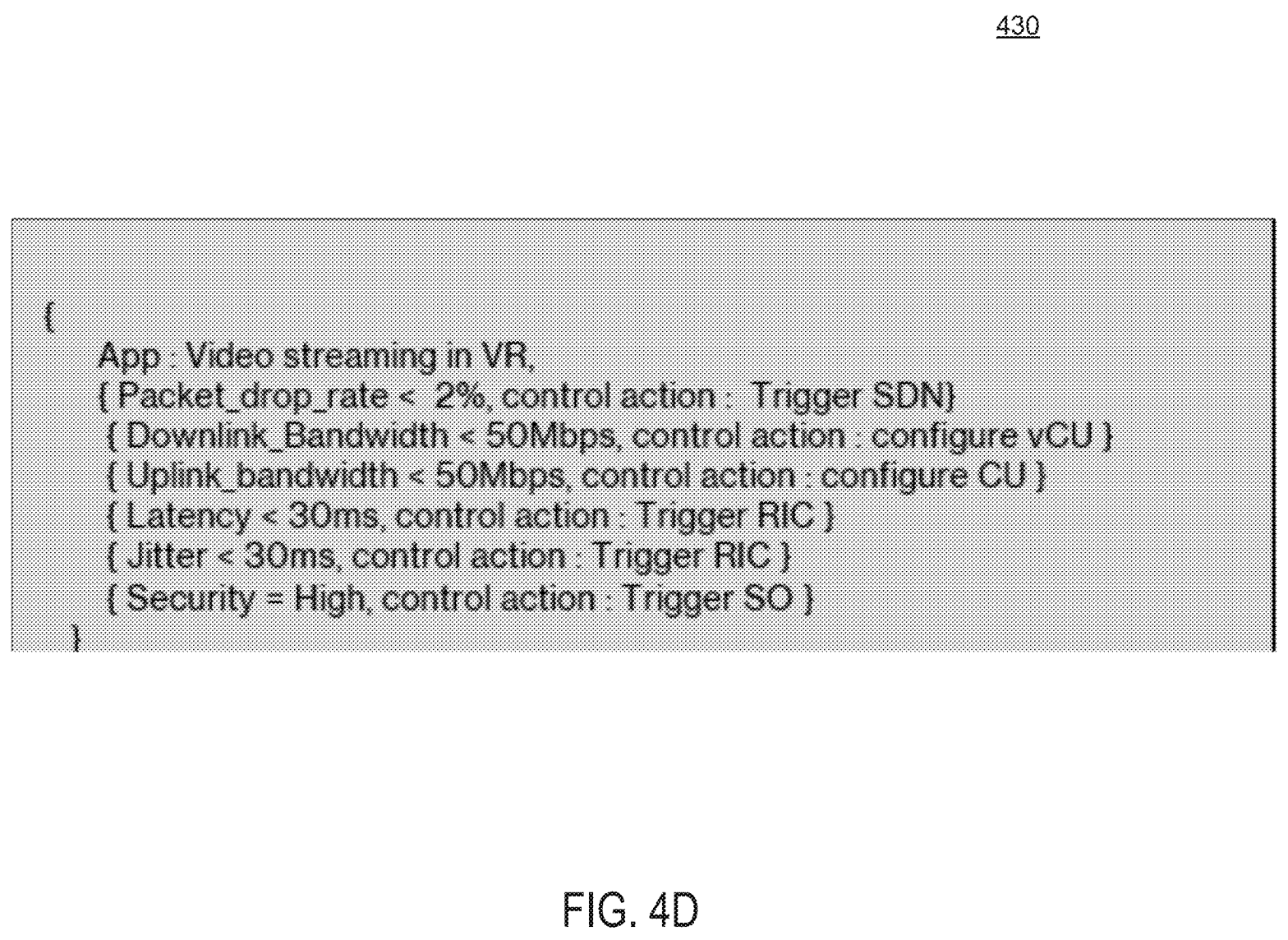

App : Video streaming in VR,
{
( Packet_drop_rate < 2%, control action : Trigger SDN )
( Downlink_Bandwidth < 50Mbps, control action : configure VCU )
( Uplink_bandwidth < 50Mbps, control action : configure CU )
( Latency < 30ms, control action : Trigger RIC )
( Jitter < 30ms, control action : Trigger RIC )
( Security = High, control action : Trigger SO )
}

FIG. 4D

SYSTEM AND METHOD FOR NETWORK SLICE DEPLOYMENT

BACKGROUND INFORMATION

Network slicing in fifth generation (5G) networks refers to a network configuration that allows multiple networks to be implemented within a common 5G network architecture.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 illustrates an exemplary workflow according to some embodiments of the present disclosure;

FIGS. 4A-4D illustrate non-limiting example embodiments of the present disclosure.

DETAILED DESCRIPTION OF EXAMPLE EMBODIMENTS

Figure 1:
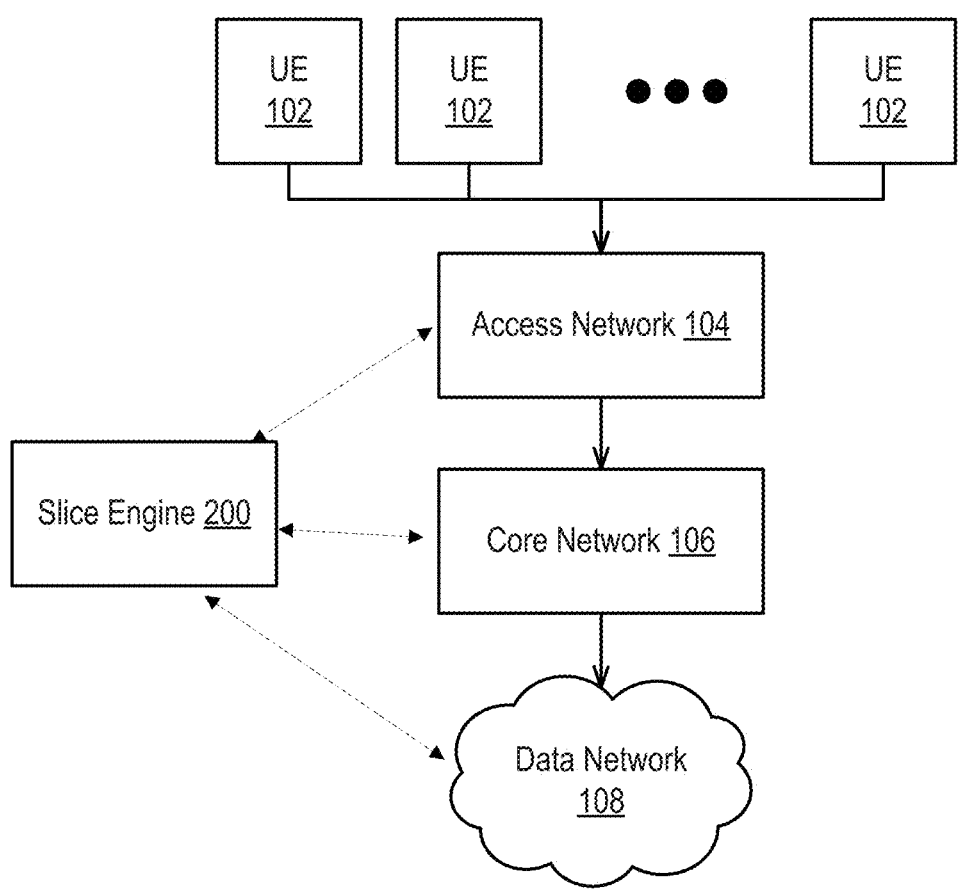
FIG. 1 is a block diagram of an example network architecture according to some embodiments of the present disclosure.

Network slicing involves a logical group of 5G network functions that spans the far edge of the 5G infrastructure, the edge of the 5G infrastructure and the 5G core. A network slice refers to a logically shared or isolated, end-to-end portion of a 5G network that is dedicated to providing specific services or functionalities. For example, a network slice allows network operators to create multiple virtual networks on a shared physical infrastructure, tailoring each slice to meet the unique requirements of different applications, industries, or customers.

A network slice comprises various network resources, including radio access network (RAN) resources, core network resources, and transport network resources. These resources are allocated and optimized to deliver the desired quality of service (QOS) and performance characteristics for the specific use case associated with the slice.

Network slicing enables the efficient utilization of network infrastructure by dynamically allocating resources based on demand, traffic patterns, and service requirements. Network slicing allows the network to be flexible and adaptable, supporting diverse use cases with varying latency, bandwidth, security, and reliability needs.

By way of a non-limiting example, a network operator can create different slices for enhanced mobile broadband (eMBB) services, massive machine-type communications (mMTC), and ultra-reliable low-latency communications (URLLC). Each slice can be customized to meet the specific needs of applications, such as, for example, high-definition video streaming, Internet of Things (IoT) connectivity, or mission-critical communications.

By leveraging network slicing. 5G networks can provide a more scalable, efficient, and versatile infrastructure, accommodating a wide range of use cases and applications with different service requirements.

Accordingly, as discussed herein, 5G network operating environments can implement network slice profiles. A network slice profile is a predefined template or specification that defines the characteristics, capabilities, and parameters of a network slice. A network slice profile can provide a standardized way of describing the attributes and requirements of a particular slice, allowing network operators and service providers to create and deploy slices with consistent configurations.

According to some embodiments, a network slice profile can include information related to, but not limited to, a service type, QoS, resource allocation, security and isolation, network function virtualization (NFV) and software-defined network (SDN), lifecycle management, and the like.

In some embodiments, service type information can specify a type of service or use case a slice is designed for, such as, as discussed above, eMBB, mMTC, URLLC, and the like. QoS information can correspond to QoS parameters that can define performance metrics and QoS requirements for the slice, including parameters such as latency, throughput, reliability, and availability. Resource allocation information can describe an allocation of network resources, including radio spectrum, computing resources, and bandwidth, to meet demands of an intended service or application. Security and Isolation information can specify security mechanisms, protocols and isolation requirements necessary to protect the slice from unauthorized access or interference. NFV and SDN information can provide requirements that outline a virtual network function (VNF) and software-defined network components needed to implement the slice, along with any specific configurations or interoperability requirements. And, lifecycle management information can define lifecycle phases of the slice, including provisioning, activation, monitoring, scaling, and termination, as well as any associated management and orchestration processes.

Accordingly, as discussed herein, a network slice profile can serve as a blueprint for creating and configuring network slices, ensuring consistency and interoperability across different deployments. Network slice profiles can enable network operators to efficiently provision and manage slices based on standardized templates, simplifying the deployment of diverse services and reducing the time-to-market for new applications in 5G networks.

Under conventional mechanisms and systems, a single enterprise or group of devices belonging to a same enterprise use/consume the same slice profile (e.g., a single slice profile per enterprise regardless of number and types of devices, or varying types of different users and/or use cases). Such slice profiles are governed by the same service level agreements (SLAs). This, however, is not a preferred way to operate, as certain runtime environments (e.g., gaming versus social versus streaming, and the like) require different quality of service types to properly provide performance needed for such virtual experiences. Accordingly, slice performance cannot be assured for each user's desired operational environment. Additionally, there is no single analytics and assurance system that can meet all the analytics and assurance requirements for all 5G core and RAN applications.

The disclosed systems and methods provide a novel framework that addresses such shortcomings, among others, by providing mechanisms for automatically generating slice profiles based on device experience modes, which can translate to service assurance profiles to adhere/maintain SLAs. As discussed in more detail below, the disclosed systems and methods can automate the generation of a fully deployable network slice profile, which enables functionality for the scaling of network slices per operational environment of such devices. Moreover, the translation of the slice profile to service assurance profiles can provide network stability, which can, among other benefits, improve operator reputation in maintaining SLAs.

FIG. 1 is a block diagram of an example network architecture according to some embodiments of the present disclosure. In the illustrated embodiment, UE 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, wired devices, wireless handsets, gaming consoles, unmanned aerial vehicles (UAVs) unmanned ground vehicles (UGVs), and any other devices equipped with a cellular or wireless or wired transceiver. One example of a UE is provided in FIG. 5.

In the illustrated embodiment, the access network 104 comprises a network allowing network communication with UE 102. In general, the access network 104 includes at least one base station that is communicatively coupled to the core network 106 and coupled to zero or more UE 102.

In some embodiments, the access network 104 comprises a cellular access network, for example, a 5G network. In an embodiment, the access network 104 can include a NextGen Radio Access Network (NG-RAN). In an embodiment, the access network 104 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as the Internet.

In the illustrated embodiment, the access network 104 and the core network 106 are operated by a NO. However, in some embodiments, the networks (104, 106) may be operated by a private entity and may be closed to public traffic. For example, the components of the network 106 may be provided as a single device, and the access network 104 may comprise a small form-factor base station. In these embodiments, the operator of the device can simulate a cellular network, and UE 102 can connect to this network similar to connecting to a national or regional network.

In some embodiments, the access network 104, core network 106 and data network 108 can be configured as a multi-access edge computing (MEC) network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

FIG. 1 further includes slice engine 200 which is configured for performing network slice profile generation and deployment. Slice engine 200 can be a special purpose machine or processor, and could be hosted by or integrated into functionality associated with access network 104, core network 106 and/or data network 108, or some combination thereof. For example, slice engine 200 can be configured to connect to and/or integrate with eNodeB and gNodeB components (of access network 104) that connect core network 106 to UE 102. In another example, slice engine 200 can be hosted on a 5G Core—e.g., on network 106. In some embodiments, slice engine 200 can be implemented in an orchestration tool set (e.g., a Service Design Center (SDC) that is part of an operation support system(s) (OSS)). In some embodiments, slice engine 200 can be implemented as part of and/or via a business support system (BSS). And, in some non-limiting embodiments, slice engine 200 can be executed via UE 102.

In some embodiments, engine 200 can be hosted by any type of network server, such as, but not limited to, an edge node or server, application server, content server, web server, and the like, or any combination thereof.

Figure 2:
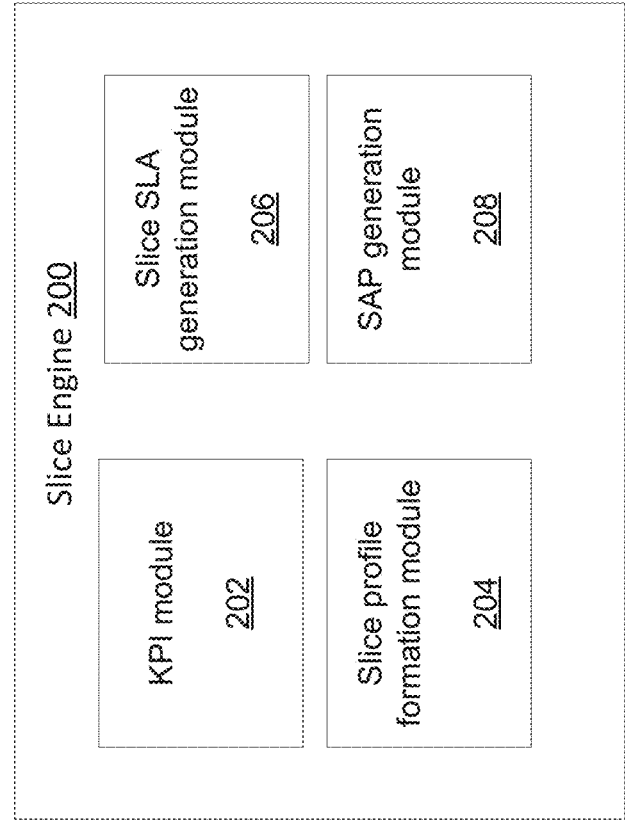
FIG. 2 is a block diagram illustrating components of an exemplary system according to some embodiments of the present disclosure.

As depicted in FIG. 2, slice engine 200 can include, but is not limited to, key performance indicator (KPI) module 202, slice profile formation module 204, slice SLA generation module 206 and slice assurance profile (SAP) generation module 208.

In some embodiments, as discussed above, KPI module 202 can determine a quantified value for operations executing on a network, and/or a quantified value of the status of the network and its components operating thereon. In some embodiments, KPI module 200 can operate artificial intelligence and/or machine learning (AI/ML) models, algorithms or technologies to determine the KPI values. In some embodiments, the inputs to such AI/ML models can be provided via a data lake (or database) that is a centralized repository for structured, semi-structured and/or unstructured data. Further detail of the operation of KPI module 206 will be discussed below in relation to FIGS. 3, 4A and 4B.

In some embodiments, slice profile formation module 204 can function to generate a specific slice profile for the operating environment of a UE (or device, used interchangeably). Further detail of operation of slice profile formation module 204 will be discussed below in relation to FIGS. 3, 4A and 4C.

In some embodiments, slice SLA generation module 206 can function to generate a slice SLA for the generated slice profile, which as mentioned above and below in more detail, can ensure the translation of the device's operations to a service assurance (SA) profile to maintain the appropriate SLA. Further detail of operation of SLA generation module 206 will be discussed below in relation to FIGS. 3, 4A and 4D.

In some embodiments, SAP generation module 208 can provide or generate a SAP for the UE based on the SLA. Further detail of operation of SAP generation module 208 will be discussed below in relation to FIGS. 3 and 4A.

In some embodiments, slice engine 200 can be connected to a database or data store (not shown). The database can store information collected, processed and/or determined from the computations performed by each module 202-208. Such information can include data and metadata associated with local and/or network traffic information related to enterprises, users, UEs, services, applications, content and the like.

It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 3 and 4A-4D.

FIG. 3 provides Process 300 which details non-limiting example embodiments of the slice engine 200's implementation for generation and implementation of a slice profile.

According to some embodiments, Steps 302-308 of Process 300 can be performed by KPI module 202 of slice engine 200; Step 310 can be performed by slice profile formation module 204; Steps 312-314 can be performed by slice SLA generation module 206; and Steps 316-318 can be performed by SAP generation module 208.

Process 300 begins with Step 302 where an application executing on or by a UE is identified. In some embodiments, Step 302 can identify a type of application, type of device, and/or operational values of the application (e.g., network traffic, pixel values, resolution, and the like). By way of a non-limiting examples, Step 302 can involve identifying information related to a complex multi-player game being played on a mobile computer, on a gaming console with actuators or via augmented reality or virtual reality (AR/VR) equipment. In another non-limiting example, Step 302 can involve identifying the device as a drone performing surveillance, which involve live streaming of the captured footage. And, in yet another non-limiting example, the drone can be performing physical actions, such as, but not limited to, package delivery, facial recognition, and the like, or some combination thereof.

In Step 304, historical KPI data for the application is retrieved. In some embodiments, as discussed above, engine 200 can leverage application data for the identified application (and UE, in some embodiments) as a query to a data lake (or database), where previous KPI data for the same or similar types of applications can be retrieved. For example, if the application is a virtual reality (VR) application executing on a UE, then the KPI for other types of VR applications can be retrieved. In some embodiments, the retrieved KPI data can be based on, but not limited to, a type of application, category of application, type of user device, type of local or network activity generated via the application's execution, provider of the application, and the like, or some combination thereof. In some embodiments, values related to the performance of the application (e.g., the operational values of the application, as per Step 302) can be utilized as a basis for retrieving KPI values in Step 304.

In Step 306, the data related to the application (from Step 302) and the retrieved KPI values (from Step 304) can be analyzed. In some embodiments, the analysis in Step 306 can be any type of known or to be known computational analysis technique, algorithm, mechanism or technology to analyze the application data and KPI values.

In some embodiments, engine 200 may include a specifically trained AI/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof. In some embodiments, such AI/ML computational analysis can be performed based on a data store of information and/or collected data during a time period, which can enable KPI determinations as per specific historical data, which can be based on, but not limited to, a user, a device, an application, an event, a network, and the like, or some combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the application and/or KPI data, as discussed herein.

In Step 308, based on the analysis from Step 306, engine 200 can determine KPI values for the runtime environment of the application executing on UE. For example, the KPI values can provide information related to, but not limited to, bandwidth, latency, measurements, signal strength, outages, alerts, alarms, locations, frequency, and the like, and/or any other type of network data related to an application executing on a UE. In some embodiments, the KPI values can be a product of extraction of the application information, whereby a predetermined number of KPI values for a predetermined number of categories can be determined (e.g., 42 KPIs for 5 categories, as per 3GPP specifications). In some embodiments, such extraction can involve extraction of particular types of data (e.g., latency, bandwidth, and the like) and/or keywords, for example. Accordingly, the determined KPI values for the application can indicate how operations are performing on a network.

Figure 4A:
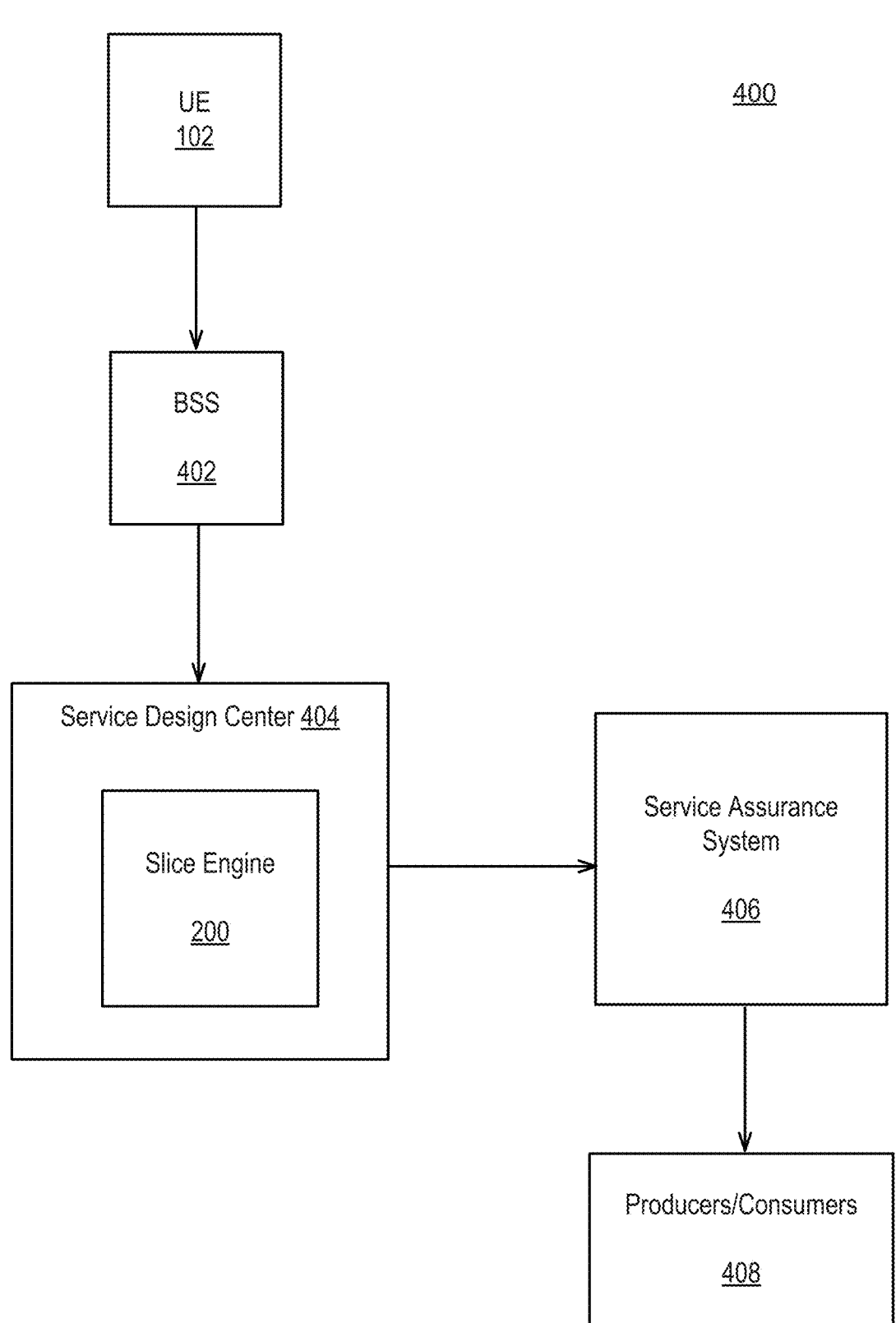

Turning to FIG. 4A, depicted is example environment 400, which includes UE 102, base station subsystem (BSS) 402, service design center (SDC) 404, service assurance (SA) system 406 and producers/consumers 408 (e.g., cloud orchestrators, transport orchestrators, RAN orchestrators, MEC orchestrators, as discussed below). With relation to Steps 302-308, for example, an application executing on UE 102 can have its data relayed via BSS to SDC 404, such that slice engine 200 executing on SDC 404 can perform the KPI determination of Step 308.

Accordingly, in some embodiments, KPI module 202 of engine 200 can perform the operations of Steps 302-308, and as a result, produce/determine KPI values for the application. Thus, as discussed above, upon identification (or extraction) of information related to the UE application and/or AI/ML determinations (or predictions) based on historical data, as discussed supra, suitable KPIs can be derived for optimal performance, as discussed herein. An example of such KPI values are provided in example 410 of FIG. 4B, which provides non-limiting example KPI values related to accessibility, integrity, utilization, mobility and retainability.

Turning back to FIG. 3, processing proceeds to Step 310 where a slice profile can be generated. According to some embodiments, the generated slice profile can be custom-built based on the KPI values determined in Step 308 and the application information identified in Step 302. Accordingly, as discussed above, the slice profile can be generated so as to facilitate optimal (or quality, or high-quality) performance of the application in relation to the application's operational values.

By way of a non-limiting example, depicted in FIG. 4C are three example slice profiles 420, 422 and 424. Each slice profile depicts a unique operating environment and KPI values. In some embodiments, the operating environment can correspond to application characterization, which can include, but is not limited to, a type of activity and experience mode (e.g., pixel values, resolution, and the like). For example, 1080 pixel, three-dimensional (3D), 4K. 8K, VR, AR, and the like, and/or any other type of robotic action related to memory, processor and/or network intensive applications, and the like. In some embodiments, the KPI values can provide information related to, but not limited to, latency characterizations, throughput characterizations, reliability characterizations, availability characterizations, security characterizations, and the like.

For example, slice profile 420 can be for a VR streaming experience with specific network characteristics, as depicted in FIG. 4C. In another example, slice profile 422 can correspond to a single player game with specific bandwidth requirements for enabling optimal performance of the game play. And, in another non-limiting example, slice profile 424 can be for a multiplayer game with specific KPI values for preferred performance.

Continuing with Process 300, in Step 312 a slice SLA is generated based on the slice profile (from Ste 310) and the KPI values (from Step 308). In some embodiments, engine 200 can compile the slice profile and the KPI values based on a service level agreement (SLA) for the network (for which the application/UE is operating), whereby the slice SLA is generated.

In Step 314, input can be received related to consent of the generated slice SLA (from Step 312). In some embodiments, Step 314 can provide information to UE 102, for which consent can be provided. In some embodiments, for example, information related to the consent can enable read/write access to a slice profile for engine 200, SDC 404, SA system 406 and producers/consumers 408, as discussed below. Such consent enables the slice SLA to be enforced and/or deployed on the network.

In Step 316, engine 200 can generate a SA profile, which can be based on, in connection and/or compliance with the generated slice SLA from Step 314. In some embodiments, the SA profile can be configured for all types of producers/consumers 408, including, for example, cloud orchestrators, transport orchestrators, RAN orchestrators, MEC orchestrators, and the like. In some embodiments, the SA profile can be utilized and/or leveraged by network components, entities, devices and/or applications (e.g., producers/consumers 408). A non-limiting example of a SA profile is depicted in FIG. 4D as SA profile 430.

And, in Step 318, the slice profile in line with the SA profile can be deployed for usage in a runtime environment. For example, as in FIG. 4A, SA system 406 can provide enforcement of the SA profile for which producers/consumers 408 in a runtime environment can operate in accordance with the generated slice profile. In some embodiments, Step 318 can be utilized via multiple producers/consumers (e.g., vendors) or single vendors.

Accordingly, the disclosed operations of Process 300 provide mechanisms for automatically generating slice profiles based on device experience modes, which can translate to service assurance profiles to adhere/maintain service level agreements. Thus, upon deployment of slice profiles, which are specific to the experience modes of each application within a network, the disclosed operations can enable scaling of network operations while maintaining network stability and integrity.

Figure 5:
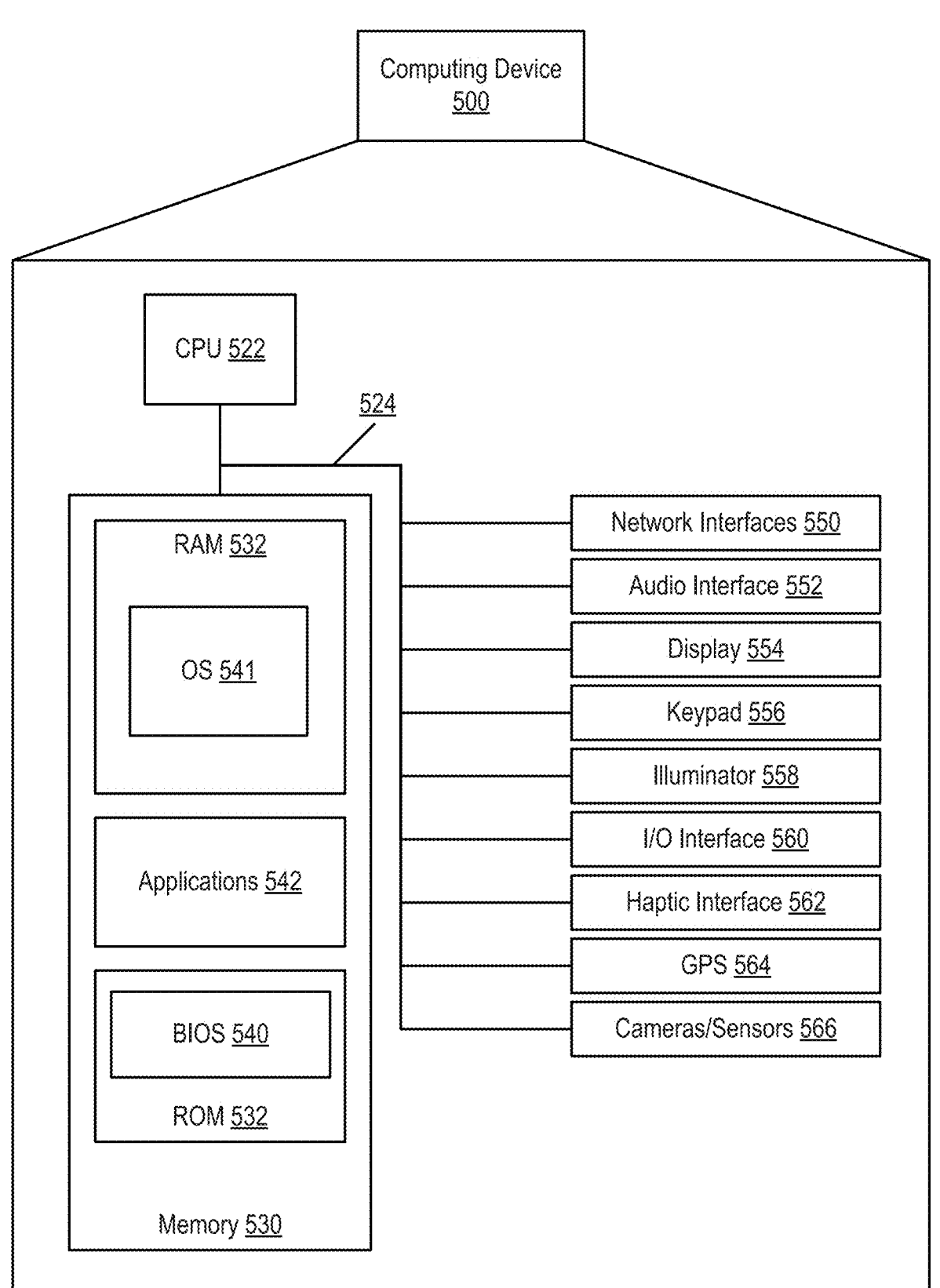
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a central processing unit (CPU) 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

identifying, by a network device, an application executing on a device over a network;

analyzing, by the network device, information related to the application executing on the device, the analyzed information comprising a type of application and operational values of the application;

determining, by the network device, based on the analysis, key performance indicator (KPI) data for the application;

generating, by the network device, based on the determined KPI data, a slice profile for the application, the slice profile comprising information enabling quality performance of the application in accordance with the operational values;

generating, by the network device, based at least in part on the slice profile and a service level agreement (SLA) for the network, a slice assurance (SA) profile; and executing, by the network device, over the network, a runtime environment via the slice profile in compliance with the SA profile.

2. The method of claim 1, further comprising:

determining a slice SLA based on the slice profile and the determined KPI data, the slice SLA enabling the network device to maintain the SLA for the slice profile during the runtime environment, wherein the SA profile is based on the slice SLA.

3. The method of claim 2, further comprising:

receiving consent for usage of the slice SLA.

4. The method of claim 1, wherein the slice profile comprises information characterizing an experience mode of the application and the KPI data.

5. The method of claim 1, wherein the KPI data comprises information related to network characteristics of the operational values of the application, wherein the KPI data corresponds to a set of values and categories.

6. The method of claim 1, wherein the runtime environment comprises network orchestrators performing operations within a fifth generation (5G) network.

7. The method of claim 1, further comprising:

identifying, based on the application information, historical KPI data, wherein the analysis of the application information is based on the historical KPI data.

8. The method of claim 7, wherein the historical KPI data is retrieved from a datastore based on the application information.

9. A device comprising:

a hardware processor configured to:

identify an application executing on a device over a network;

analyze information related to the application executing on the device, the analyzed information comprising a type of application and operational values of the application;

determine, based on the analysis, key performance indicator (KPI) data for the application;

generate, based on the determined KPI data, a slice profile for the application, the slice profile comprising information enabling quality performance of the application in accordance with the operational values;

generate, based at least in part on the slice profile and a service level agreement (SLA) for the network, a slice assurance (SA) profile; and execute, over the network, a runtime environment via the slice profile in compliance with the SA profile.

10. The device of claim 9, wherein the processor is further configured to:

determine a slice SLA based on the slice profile and the determined KPI data, the slice SLA enabling the processor to maintain the SLA for the slice profile during the runtime environment, wherein the SA profile is based on the slice SLA.

11. The device of claim 9, wherein the slice profile comprises information characterizing an experience mode of the application and the KPI data.

12. The device of claim 9, wherein the KPI data comprises information related to network characteristics of the operational values of the application, wherein the KPI data corresponds to a set of values and categories.

13. The device of claim 9, wherein the runtime environment comprises network orchestrators performing operations within a fifth generation (5G) network.

14. The device of claim 9, wherein the processor is further configured to:

identify, based on the application information, historical KPI data, wherein the analysis of the application information is based on the historical KPI data, wherein the historical KPI data is retrieved from a datastore based on the application information.

15. A non-transitory computer-readable storage medium storing instructions, executable by a hardware processor of a network device, wherein the instructions are configured to:

identify an application executing on a device over a network;

analyze information related to the application executing on the device, the analyzed information comprising a type of application and operational values of the application;

determine, based on the analysis, key performance indicator (KPI) data for the application;

generate, based on the determined KPI data, a slice profile for the application, the slice profile comprising information enabling quality performance of the application in accordance with the operational values;

generate, based at least in part on the slice profile and a service level agreement (SLA) for the network, a slice assurance (SA) profile; and execute, over the network, a runtime environment via the slice profile in compliance with the SA profile.

16. The non-transitory computer-readable storage medium of claim 15, wherein the instructions are further configured to:

determine a slice SLA based on the slice profile and the determined KPI data, the slice SLA enabling the hardware processor to maintain the SLA for the slice profile during the runtime environment, wherein the SA profile is based on the slice SLA.

17. The non-transitory computer-readable storage medium of claim 15, wherein the slice profile comprises information characterizing an experience mode of the application and the KPI data.

18. The non-transitory computer-readable storage medium of claim 15, wherein the KPI data comprises information related to network characteristics of the operational values of the application, wherein the KPI data corresponds to a set of values and categories.

19. The non-transitory computer-readable storage medium of claim 15, wherein the runtime environment comprises network orchestrators performing operations within a fifth generation (5G) network.

20. The non-transitory computer-readable storage medium of claim 15, wherein the instructions are further configured to:

identify, based on the application information, historical KPI data, wherein the analysis of the application information is based on the historical KPI data, wherein the historical KPI data is retrieved from a datastore based on the application information.

* * * * *